US012600394B2

(12) United States Patent (10) Patent No.: US 12,600,394 B2

Ebadian et al. (45) Date of Patent: Apr. 14, 2026

(54) SECURITY BIN WITH A HYDRAULIC LIFT TABLE

(71) Applicant: Phiston Technologies, Inc., Miramar, FL (US)

(72) Inventors: M. Ali Ebadian, Miramar, FL (US); Raul Travieso, Hollywood, FL (US); Douglas Graham, Miramar, FL (US)

(73) Assignee: Phiston Technologies, Inc., Miramar, FL (US)

( * ) Notice: Subject to any disclaimer, the term of this patent is extended or adjusted under 35 U.S.C. 154(b) by 417 days.

(21) Appl. No.: 18/467,176

(22) Filed: Sep. 14, 2023

(65) Prior Publication Data

US 2024/0367703 A1    Nov. 7, 2024

Related U.S. Application Data

(60) Provisional application No. 63/500,477, filed on May 5, 2023.

(51) Int. Cl.
| | |
|---|---|
| *B62B 3/04* | (2006.01) |
| *B62B 3/00* | (2006.01) |
| *B62B 3/02* | (2006.01) |

(52) U.S. Cl.
CPC ................ *B62B 3/04* (2013.01); *B62B 3/004* (2013.01); *B62B 3/005* (2013.01); *B62B 3/02* (2013.01)

(58) Field of Classification Search
CPC .. B62B 3/02; B62B 3/004; B62B 3/04; B62B 2202/56; B62B 2203/10; B62B 2203/07; B62B 2203/13; B62B 2203/60; B62B 5/0089; B62B 5/0096; B60P 1/02; B60P 1/44; B60P 1/4414; B60P 1/4492; E05D 3/06; E05D 3/08; E05D 3/14; E05D 3/18; E05D 3/183; E05D 5/12; E05D 5/127; E05D 5/128; E05D 7/10; E05D 7/1005; E05D 7/1011; E05D 7/1022; E05D 7/12; E05D 7/125; B65F 1/16; B65F 1/1615; B65F 1/1646; B65D 43/16; B65D 43/161; B65D 43/165; B65D 43/166; B65D 43/167; B65D 55/02

See application file for complete search history.

(56) References Cited

U.S. PATENT DOCUMENTS

| | | | |
|---|---|---|---|
| 7,324,321 B2 | 1/2008 | Olliges | |
| 7,852,590 B1 | 12/2010 | Olliges | |
| 8,064,183 B2 | 11/2011 | Olliges | |
| 8,794,559 B1 | 8/2014 | Olliges et al. | |
| 9,776,192 B2 | 10/2017 | Ebadian et al. | |
| 10,071,382 B1 | 9/2018 | Ebadian et al. | |
| 10,242,699 B1 | 3/2019 | Ebadian et al. | |
| 10,657,345 B1 | 5/2020 | Ebadian et al. | |
| 11,267,647 B2 | 3/2022 | Ebadian et al. | |
| 2019/0277552 A1* | 9/2019 | Vu ........................ F25D 23/025 |
| 2019/0308848 A1* | 10/2019 | Litteral ................ B66B 5/0056 |
| 2021/0200210 A1* | 7/2021 | Gil ....................... G05D 1/0088 |

\* cited by examiner

*Primary Examiner* — Glenn F Myers

(74) *Attorney, Agent, or Firm* — McHale & Slavin, P.A.

(57) ABSTRACT

A media drive security bin with a hydraulic lift table for storing and transporting media drives while ensuring secure tracking and retrieval of the media drives from the bin. The lift table features a foot pedal operation to raise the table and hand lever for lowering. A secure scanner is mounted along a chamber entrance to provide recordation of all information pertinent to the holding and transportation of the media data drives. A window provides ease of visual confirmation of the media bin contents.

9 Claims, 6 Drawing Sheets

(SECTION C-C)

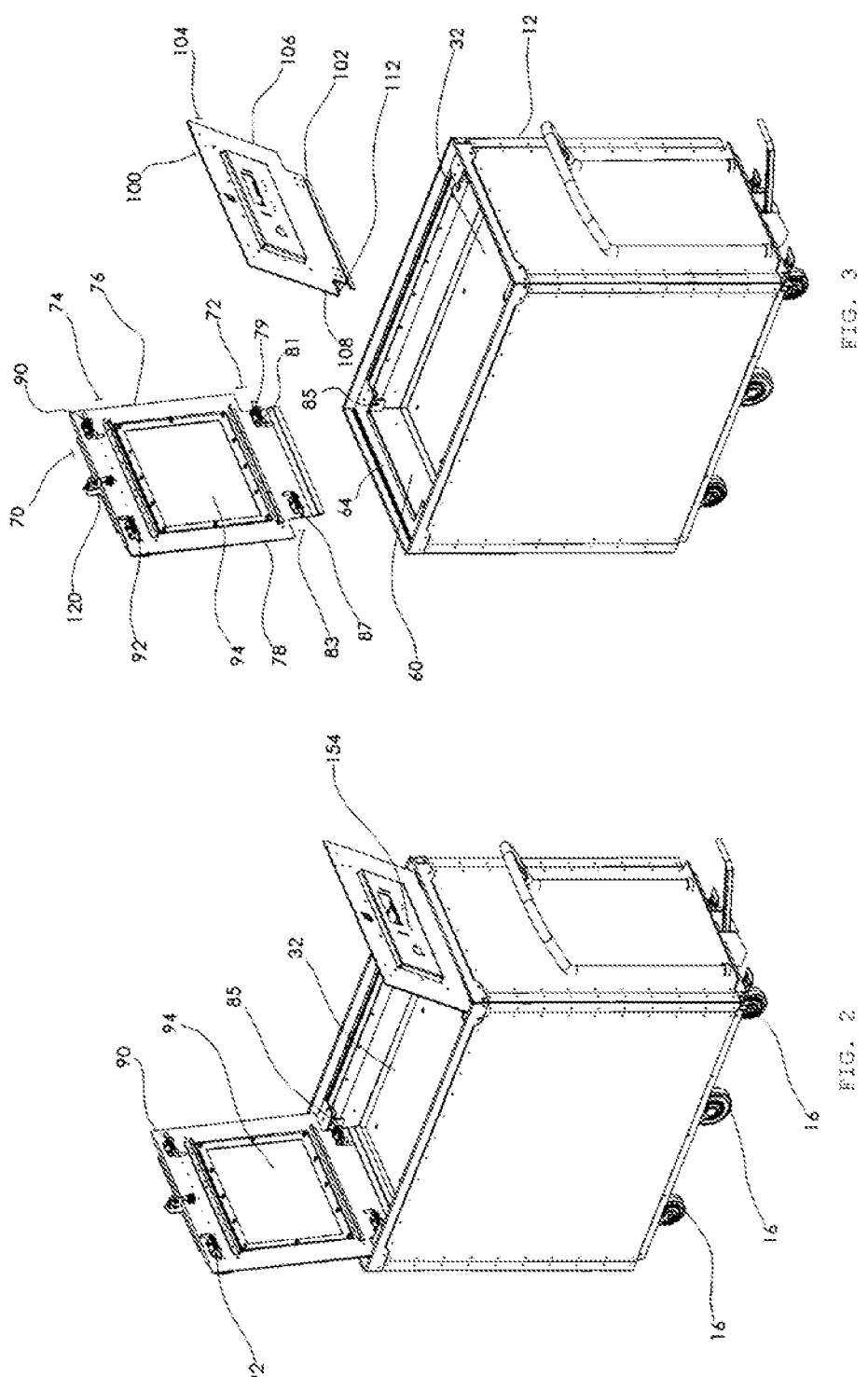

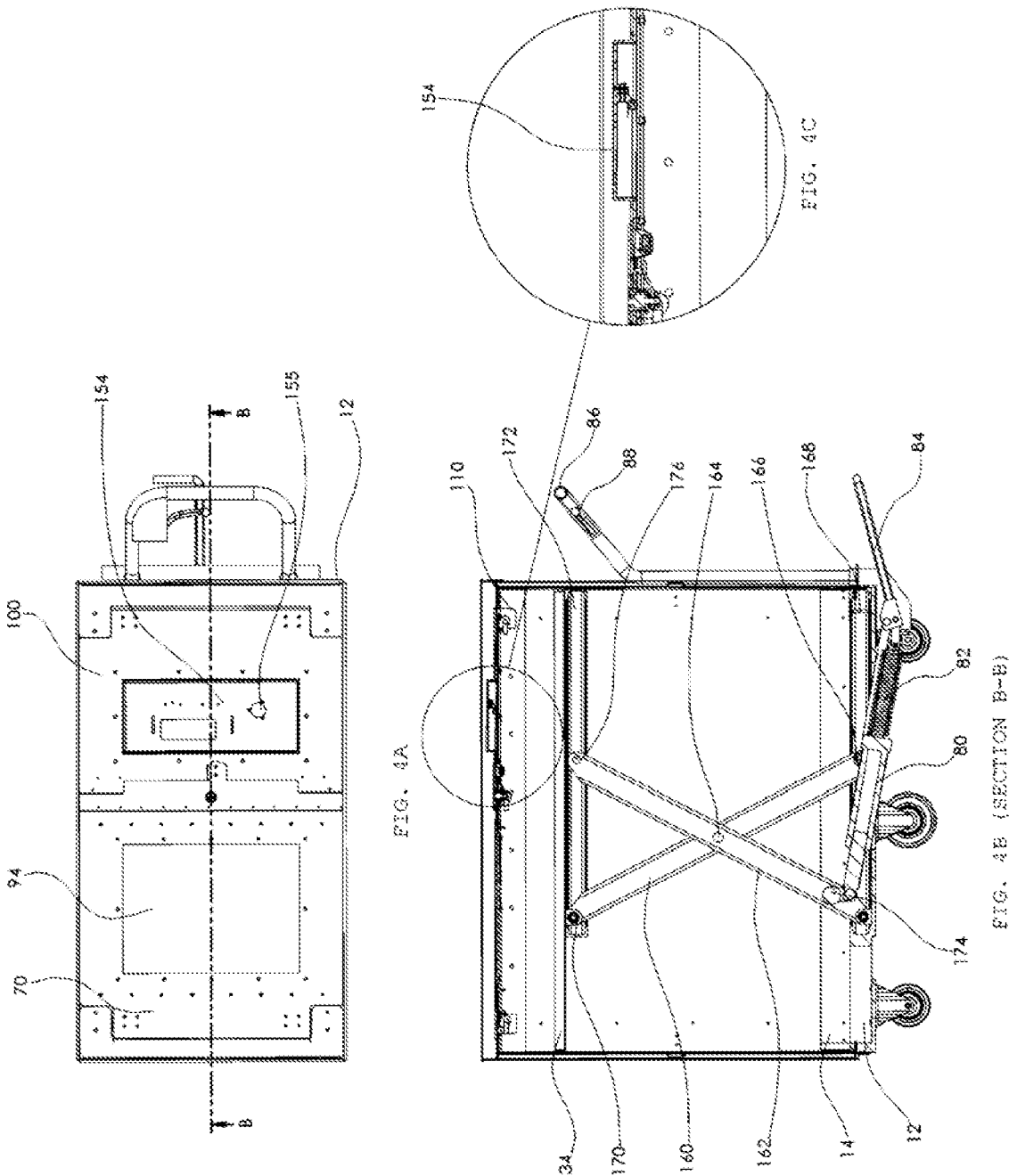

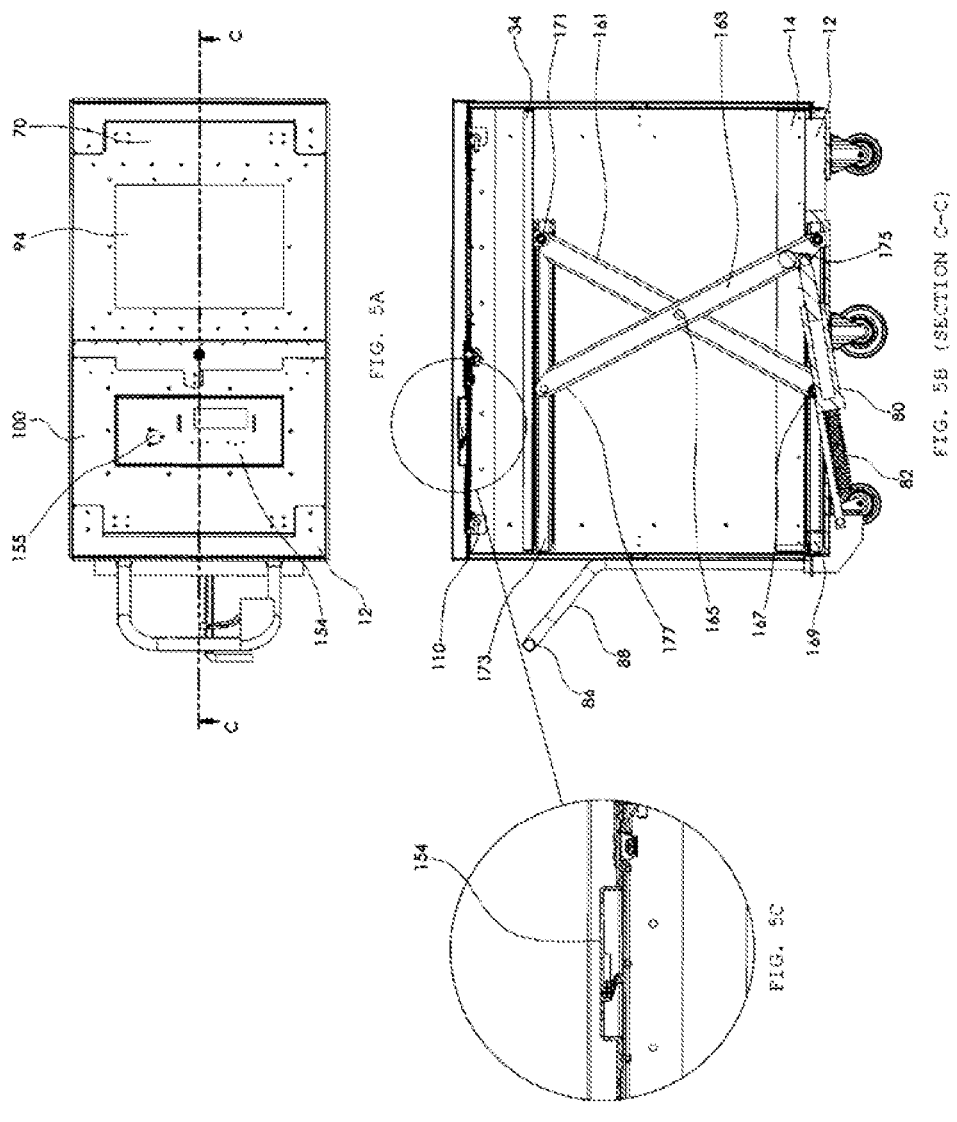

FIG. 6A (SECTION C-C)

SECURITY BIN WITH A HYDRAULIC LIFT TABLE

PRIORITY CLAIM

In accordance with 37 C.F.R. $1.76, a claim of priority is included in an Application Data Sheet filed concurrently herewith. Accordingly, the present invention claims priority to U.S. Provisional Patent Application No. 63/500,477 entitled "MEDIA DRIVE HOLDING BIN WITH A HYDRAULIC LIFT TABLE AND SECURE TRANSPORTATION", filed May 5, 2023. The contents of which the above referenced application is incorporated herein by reference.

FIELD OF THE INVENTION

This invention is related to the field of sensitive material storage and, in particular, to an apparatus to provide tamperproof storage of media held for destruction having a security bin with a hydraulic lift platform used for secure holding and transportation of discarded media drives.

BACKGROUND OF THE INVENTION

Sensitive information is commonly stored on hard disk drives "HDD", solid state drives "SSD", and the media drives used for storage of data. When the life of the media drive is exhausted, it is critical that all data stored on the media drive disposed of is unrecoverable. Government loss of sensitive data can be catastrophic. Business loss of sensitive data can result in trade secret theft and business advantage over a competitor. Individual loss of sensitive data can result in identity theft. No matter how trivial the theft may appear, the resulting harm can be irreparable.

Data storage devices can be changed out due to lack of capacity or speed, mechanical malfunction, or simply due to a computer hardware/software upgrade. The proper way to destroy media is to destroy the memory storage and Applicant has patented a number of devices capable of shredding media drives in seconds. However, the shredding devices are not run 24/7 so there are times in which media drives must be stored until the shredding device is operational. Further, the shredding device may be remotely located and the media drive must be delivered to the shredder. This presents an issue as to verification that the media drive to be shredded is properly transported to the shredder.

Various data destroying apparatus are described in Applicant's prior patents such as U.S. Pat. No. 7,324,321 for a Degaussing Apparatus; U.S. Pat. No. 7,852,590 for a Solid State Memory Decommissioner; U.S. Pat. No. 8,064,183 for a Capacitor Based Bi-Directional Degaussing Apparatus; U.S. Pat. No. 8,794,559 for a Solid State Storage Device Crusher; U.S. Pat. No. 9,776,192 for a Comminuting Apparatus; U.S. Pat. No. 10,071,382 for a Solid State Drive Disintegrator; U.S. Pat. No. 10,242,699 for a Single Pulse Degaussing Device; and U.S. Pat. No. 10,657,345 for a Media Destruction Verification Apparatus. Applicant's U.S. Pat. No. 11,267,647 is directed to a security bin, the contents of which are incorporated herein by reference.

It is common to carry multiple media drives in a bin from a computer system to a shredder. If there are many media drives, the bin is on wheels. The problem arises in that the media drives are left open wherein the media data devices could be stolen or copied. Further there is no verification through a lock and key when a conventional bin is being use. In addition, simply placing media data devices in a bin require an individual to repetitively bend over to retrieve the devices, risking injury to the individual.

What is lacking in the art is a low cost security bin for securely storing and transporting media disks before their destruction or electronic waste for recycling/disposal wherein the security bin employs a hydraulic lift table.

SUMMARY OF THE INVENTION

The present invention is a media drive security bin with a hydraulic lift table for storing and transporting approximately 250 media drives (SSD/HDD) while ensuring secure tracking and retrieval of the media drives from the bin. The table features a foot pedal operation for lifting the table top allowing for ergonomic retrieval of the media drives allowing ease of operation. Ease of movement is made possible by a handle for maneuvering and industrial casters. A lockable top hatch secures the media drives during holding and transportation. The lift table preferably includes a secure scanner mounted along a chamber entrance to provide recordation of all information pertinent to the holding and transportation of the media data drives. A clear window provides ease of visual confirmation of the media bin contents. An optional caddy holder can be used for smaller media formats like USB, micro-SSD, and M-RAM modules, allowing easy bar-coding application.

An objective of the invention is to provide a security bin with a lift table for transporting media data drives between a depositing computer and a shredder of the like disposal unit.

Another objective of the invention is to provide a lifting table that avoids the need for an individual to reach into a lowered bin to retrieve media disks.

Another objective of the invention is to provide a lifting table that operates with a hydraulic piston moving a scissors arm to allow the table to be lifted on a level plane.

Still another objective of the invention is to provide a portable security bin having top mounted locking hatches with chambers sized for receipt of media data drives.

Yet still another objective of the invention is to provide a scanner and recorder for inventorying each media data drive inserted into the portable bin.

Other objectives and advantages of this invention will become apparent from the following description taken in conjunction with any accompanying drawings wherein are set forth, by way of illustration and example, certain embodiments of this invention.

BRIEF DESCRIPTION OF THE FIGURES

FIG. 2 is a perspective view thereof with the lids open;

FIG. 3 is a perspective view thereof with the lids detached;

FIG. 4A is a top view of the security bin;

FIG. 4B is a left cross sectional side view;

FIG. 4C is an enlarged view of the trap door;

FIG. 5A is a top view of the security bin;

FIG. 5B is a right cross sectional side view;

FIG. 5C is an enlarged view of the trap door;

FIG. 6A is a left cross sectional side view with a scanner mechanism;

DETAILED DESCRIPTION OF THE INVENTION

Figure 1:
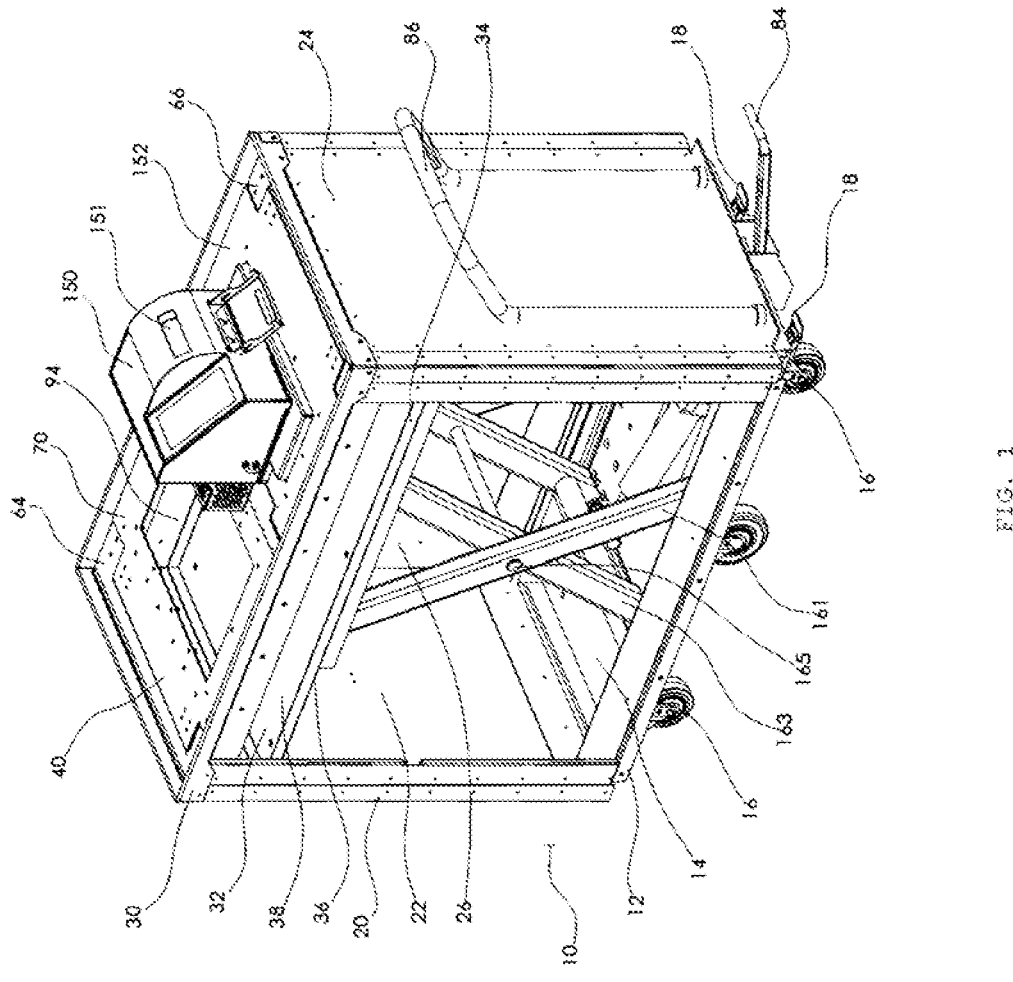
FIG. 1 is a perspective view of the security bin with the front panel removed.
Figures 6B, 6C, 7:
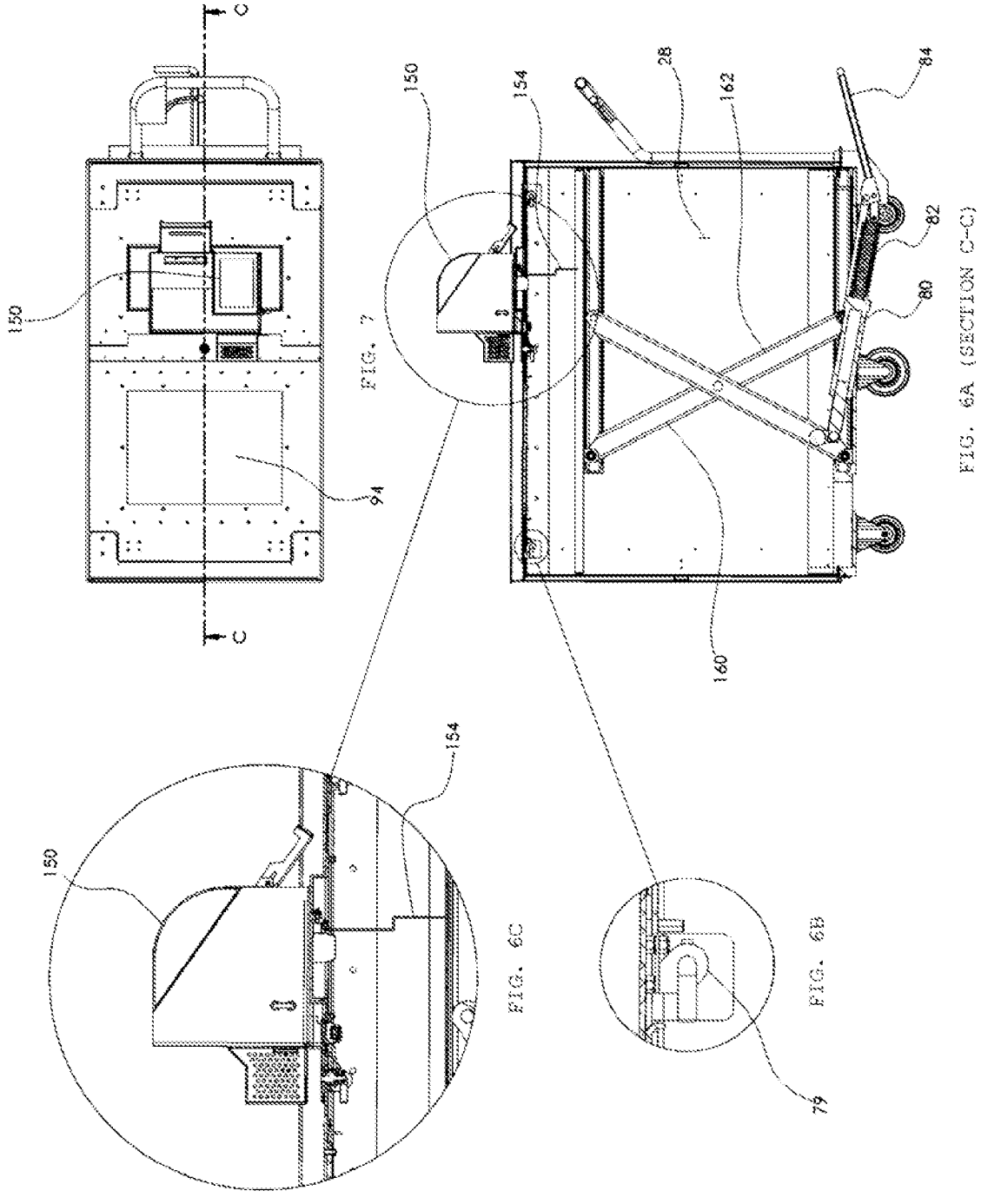
FIG. 6B is an enlarged view of the hinge pin.
FIG. 6C is an enlarged view of the scanner mechanism.
FIG. 7 is a top view of the security bin with a scanner mechanism.
Figures 8A, 8B:
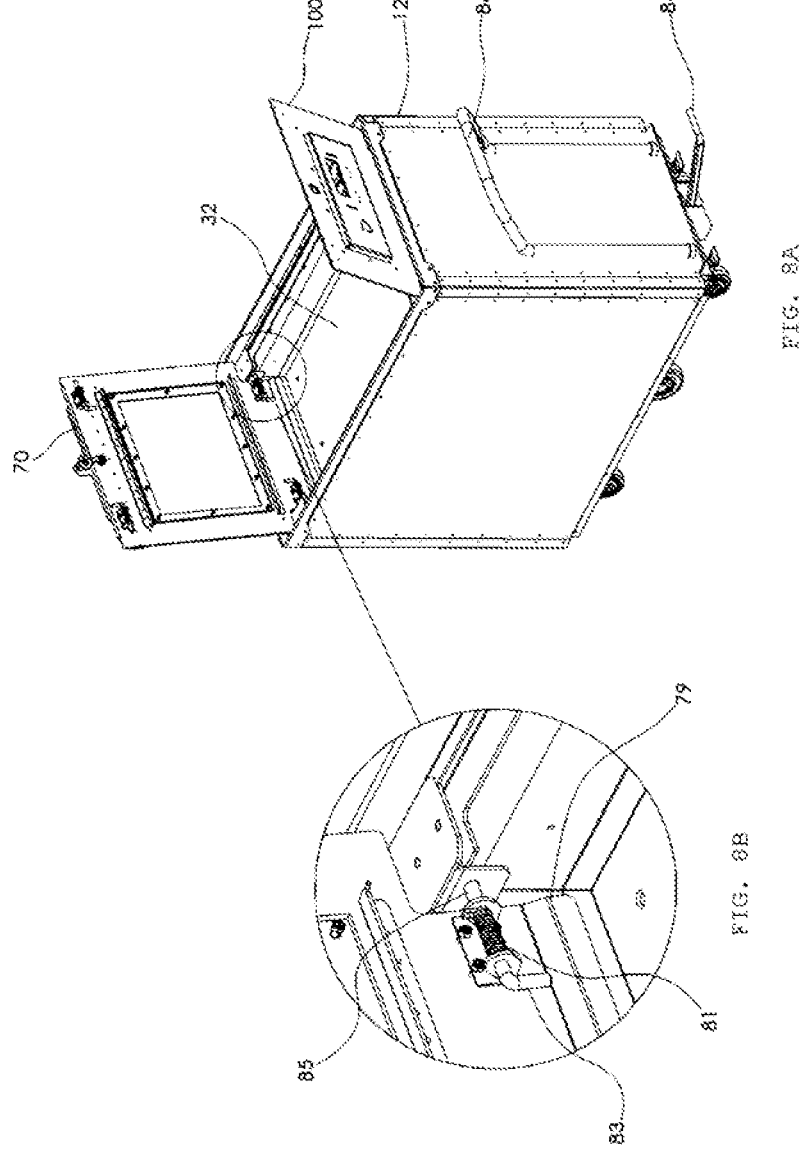
FIG. 8A is a perspective view of the security bin with lids open.
FIG. 8B is an enlarged view of the latching hook.

While the present invention is susceptible of embodiment in various forms, there is shown in the drawings and will hereinafter be described a presently preferred, albeit not limiting, embodiment with the understanding that the present disclosure is to be considered an exemplification of the present invention and is not intended to limit the invention to the specific embodiments illustrated.

Referring to the Figures in general set forth is a portable security bin 10 for media data having an elevating table. A base section 12 has a bottom 14 supported by a plurality of caster wheels 16. In one embodiment, caster wheels with locks 18 are utilized. A housing 20 is formed a first and second end wall 22, 24 and a first and second side wall 26, 28. Second side wall 28 has been removed in FIG. 1 to illustrate operating components. Each wall extends upwardly from the base section 12 to an upper edge 30 forming a rectangular shaped chamber 32.

A table 34 is positioned within the end walls 22, 24 and side walls 26, 28. The table 34 having a lower surface 36 and an upper surface 38. A first lid 70 defined by a first proximal end 72, a first distal end 74, and opposing side edges 76, 78. A hinge pin 79 is positioned alongside edge 76 and proximal end 72, and hinge pin 87 is positioned alongside edge 78 and proximal end 72. Hinge pins 79 and 87 are interchangeable with each other, as well as with the remainder of the hinge pins referred to in this specification. The element numbers are changed so as to indicate location. For clarity, hinge member 79 employs an L-shaped pin element 83 having a spring member 81 to maintain a distal end 85 in an outward position for insertion into an aperture. The distal end operates as a pivot point, allowing the lids to be rotated from a closed position to a raised position. For removal of a lid from the bin, the pin element 83 is pulled so as to overcome the spring member 81 biasing to allow retraction of the distal end 85 from its respective aperture. In this regard, pin members can be temporarily retracted by overcoming the spring force, allowing installation or removal of the lids. In this embodiment, lid 70 is rotatably secured to a cross brace 64 which is secured to inner wall support brackets 60 and 62. Similarly, a second lid 100 is rotatably secured to cross brace 66 which is secured to inner wall support brackets 60 and 62. The hinge 79 operates as a support for the pin element 83 and spring 81 which bias the pin element distal end 85 of the cross member 62 allowing the distal end 74 of the lid 70 to pivot upwardly, allowing access to the chamber 32.

Hinge pins 90 and 92 are positioned on each corner of the opposing side edges along the first distal end 74, which allows the first lid 70 to be secured to the inner bracket. Retracting of the hinge pins 90 and 92 along the distal end 74 allows the distal end 74 to pivot upwardly from a closed position. When hinge pins 79 and 87 are also retracted from the proximal end 72, together with the retracting of hinge pins 90 and 92, the first lid 70 will be detached from the bin base 12. The first bin lid 70 covers approximately one half of the opening when placed in a closed position. A plexiglass viewing window 94 is formed in a portion of said first lid 70 to allow viewing of materials placed within the chamber 32.

The second lid 100 is defined by a second proximal end 102, a second distal end 104, and opposing side edges 106 and 108; a hinge pin 110 and 112 is positioned on each of the opposing side edges 106, 108 along the second distal end 104 to pivot from a lowered position, wherein the second lid 100 and the first lid 70 cover the opening to the chamber 32 and are pivotable to a raised position wherein the second distal end 104 is raised to allow access to the chamber 32. If both the first lid 70 and second lid 100 are removed, the side walls of the bin are constructed and arranged to allow stacking with a similar shaped security bin. Stacking allows for efficiency in storing and shipping.

A lock mechanism 120 is constructed and arranged to secure the first lid 70 to the second lid 100, wherein the lock mechanism can prevent access to the chamber 32 while in a locked position, and allow the first lid 70 and the second lid 100 to pivot to an open position to allow access to said chamber in an unlocked position. The locking mechanism 120 includes a latching hook for engaging a latch receiver. A tamperproof flap prevents access to the chamber 32, unless access is gained by a key lock. In one embodiment, a plexiglass viewing panel 94 is formed in the lid to allow viewing of items placed within the chamber 32.

In one embodiment, a scanner mechanism 150 is employed for use in logging scanned media and transfer of the data to any device. The scanner 150 can be used to provide inventory control oversight and auditing. The scanner 150 utilizes a touch screen, and can read 1D and 2D barcodes placed on storage media. The scanner mechanism 150 is used to scan each media disk placed through a scanner opening 151 and store information about each said media disk in memory. The scanner 150 will automatically eject bad reads. The scanner 150 is used to prevent data falsification, and the data scanned may include operator ID, Date Code, Scanner serial numbers, tamper events, barcode numbers, media images, and so forth. RFID 155 enabled lids are utilized to trace and audit unsanitized media.

The chamber 32 is receptive to the scanner 150 by attachment to trap door 154. The second lid 100 having the same hinge pins as per the previous embodiment. A trap door 154 allows the attachment and removal of the scanner 150, linking above the RFID 155, without affecting the securing of the bin.

The scanner 150 is mounted above the chamber 32. The trap door 154 is illustrated in an open position. The trap door 154 causes the door to close upon removal of the scanner 150. Once attached, the scanner becomes the preferred manner in which to place storage media into the bin. The scanner device including sufficient memory to record sufficient data regarding each storage media placed therein for ease of tracking and forming a chain of possession.

The table 34 is raised and lowered by a first scissor arm assembly having outer scissor arm 160 and inner scissor arm 162 and a second scissor arm assembly having outer scissor arm 161 and inner scissor arm 163 pivotally attached by joiner pin 164, 165, respectively. Scissor arm 160, 161 has a lower roller means 166, 167 that slides along a lower track 168, 169 and an upper roller means 170, 171 that slides along an upper track 172, 173. Scissor arm 162, 163 has a lower roller means 174, 175 that slides along the lower track 168, 169 and an upper roller means 176, 177 that slides along the upper track 172, 173.

A hydraulic cylinder 80 is pivotally attached to the base section 12 scissor arm 162 wherein a piston 82 is moveable from a retracted position to an extended position. A foot operated actuator 84 coupled to the hydraulic cylinder 80 and used for extending the piston 82 thereby raising the table 34. A hand lever 86 is secured to a handle bar 88. The handle bar 88 is secured to the base section 12 to facilitate moving the portable security bin. The hand lever 86 is coupled to the hydraulic cylinder and used to relieve hydraulic pressure for retracting the piston 82 to allow the scissors arms to lower the table 34. In operation, media data is inserted through the hatch assembly 40 into the chamber 32 wherein the volume of the chamber 32 is adjusted by movement of the table 34. As more media is placed within the chamber, the table 34 can be lowered or placed at its lowest level. Removal of media data from the chamber 32 is facilitated by raising the table 34 by the foot operated actuator 84 for ease of access to media data.

The chamber 32 is sized to receipt about 250 media drives (SSD/HDD) and the table 34 with hydraulic cylinder 80 has a capacity of 800 or more pounds. A secure scanner, not shown, can be attached to the hatch assembly 40 for secure track and trace of all media. A caddy holder for smaller media formats like USB, micro-SSD, and M-RAM modules, allowing easy bar-coding application may also be employed.

The term "coupled" is defined as connected, although not necessarily directly, and not necessarily mechanically. The use of the word "a" or "an" when used in conjunction with the term "comprising" in the claims and/or the specification may mean "one," but it is also consistent with the meaning of "one or more" or "at least one." The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements, possesses those one or more steps or elements, but is not limited to possessing only those one or more elements. Likewise, a step of a method or an element of a device that "comprises," "has," "includes" or "contains" one or more features, possesses those one or more features, but is not limited to possessing only those one or more features.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A portable security bin for media data comprising:
a base section having a bottom supported by a plurality of caster wheels;
a housing defined by a first and second end wall and a first and second side wall, each said side wall extending upwardly from said base section to an upper edge, said walls forming a rectangular shaped chamber;
a table positioned within said end walls and said side walls, said table having a lower surface and an upper surface;

a pair of scissor arm assemblies coupling said bottom of said housing to said table, said scissor arm assemblies including:
a first scissor arm assembly having a first inner scissor arm pivotally coupled to a first outer arm by a first joiner pin, wherein said first inner scissor arm is configured to rotate relative to said first outer arm about a lateral axis of said first joiner pin and a second scissor arm assembly having a second inner scissor arm pivotally coupled to a second outer arm by a second joiner pin, wherein said second inner scissor arm is configured to rotate relative to said second outer arm about a lateral axis of said second joiner pin, said first scissor arm assembly and said second scissor arm assembly pivotally attached to one another and attached at their ends to said bottom of said housing and said table, each of said scissor arms having at least one roller on the opposite end thereof in rolling engagement with the other of said base and table;
a hydraulic cylinder pivotally attached to said base section and one of said scissor arms, said hydraulic cylinder having a piston moveable from a retracted position to an extended position;
a foot operated actuator for extending said piston;
a lever coupled to said hydraulic cylinder for use in relieving hydraulic pressure for retracting piston allowing said scissors arms to lower said table;
a hatch assembly secured to said upper edge of said housing forming a volume changeable chamber between said table and said hatch assembly, said hatch assembly formed from a first lid defined by a first proximal end, a first distal end, and opposing side edges, a hinge pin positioned on said opposing side edges along said first distal end and said first proximal end, allowing the first lid to be secured to an inner bracket, wherein retracting of said hinge pins along the distal end allows said distal end to pivot from a closed position to an open position, wherein retracting of said hinge pins along said proximal and distal ends allows said first lid to be detached from said inner brackets, and a second lid defined by a second proximal end, a second distal end, and opposing side edges, a hinge pin positioned on each said opposing side edge along said second proximal end which allows the second lid to pivot, wherein said second lid and said first lid cover said chamber and are pivotable to a raised position, wherein said second distal end is raised to allow access to said chamber; and
a lock mechanism constructed and arranged to secure said first lid to said second lid, wherein said lock mechanism can prevent access to said chamber while in a locked position and allow said first and second lid to pivot to an open position to allow access to said chamber in an unlocked position;
wherein media data is inserted through the hatch assembly into the chamber and said volume of said chamber is adjusted by movement of said table, whereby removal of media data from said chamber is facilitated by raising said table for ease of access to the media data.

2. The portable security bin for media data according to claim 1 wherein said hatch assembly is secured by a locking mechanism, wherein media data can be removed from the chamber wherein the locking mechanism allows said hatch assembly to rotate along a hinge to an open position.

3. The portable security bin for media data according to claim 1 wherein said hatch assembly is bifurcated wherein one side includes a lid including a window and one side includes a lid including said chamber, wherein each lid has an end hingedly attached to the upper edge of an end wall, and each lid is secured together with said lock mechanism.

4. The portable security bin for media data according to claim 3 wherein said lids are removable.

5. The portable security bin for media data according to claim 1 including a hand bar secured to said base section to facilitate moving the portable security bin.

6. The portable security bin for media data according to claim 1 wherein said chamber is sized to receipt about 250 media drives (SSD/HDD) with a capacity of 800+ lbs.

7. The portable security bin for media data according to claim 1 including a scanner mechanism mounted to said hatch assembly, wherein said scanner mechanism is for secure tracking and tracing of all media.

8. The security bin according to claim 1 including a scanner mechanism securable to a trap door, said scanner mechanism for use in scanning each media disk placed through a scanner opening and storing information about each said media disk in memory.

9. A portable security bin for media data comprising:

a base section having a bottom supported by a plurality of caster wheels;

a housing defined by a first and second end wall and a first and second side wall, each said side wall extending upwardly from said base section to an upper edge, said walls forming a rectangular shaped chamber;

a table positioned within said end walls and said side walls, said table having a lower surface and an upper surface;

a pair of scissor arm assemblies coupling said bottom of said housing to said table, said scissor arm assemblies including:

a first scissor arm assembly having a first inner scissor arm pivotally coupled to a first outer arm by a first joiner pin, wherein said first inner scissor arm is configured to rotate relative to said first outer arm about a lateral axis of said first joiner pin and a second scissor arm assembly having a second inner scissor arm pivotally coupled to a second outer arm by a second joiner pin, wherein said second inner scissor arm is configured to rotate relative to said second outer arm about a lateral axis of said second joiner pin, said first scissor arm assembly and said second scissor arm assembly pivotally attached to one another and attached along their ends to said bottom of said housing and said table, each of said scissor arms having at least one roller on the opposite end thereof in rolling engagement with the other of said base and table;

a hydraulic cylinder pivotally attached to said base section and one of said scissor arms, said hydraulic cylinder having a piston moveable from a retracted position to an extended position;

a foot operated actuator for extending said piston;

a lever coupled to said hydraulic cylinder for use in relieving hydraulic pressure for retracting piston allowing said scissors arms to lower said table;

a hatch assembly secured to said upper edge of said housing forming a volume changeable chamber between said table and said hatch assembly, said hatch assembly formed from a first lid defined by a first proximal end, a first distal end, and opposing side edges, a hinge pin positioned on said opposing side edges along said first distal end and said first proximal end, allowing the first lid to be secured to an inner bracket, wherein retracting of said hinge pins along the distal end allows said distal end to pivot from a closed position to an open position, wherein retracting of said hinge pins along said proximal and distal ends allows said first lid to be detached from said inner brackets, and a second lid defined by a second proximal end, a second distal end, and opposing side edges, a hinge pin positioned on each said opposing side edge along said second proximal end which allows the second lid to pivot, wherein said second lid and said first lid cover said chamber and are pivotable to a raised position, wherein said second distal end is raised to allow access to said chamber; and a lock mechanism constructed and arranged to secure said first lid to said second lid, wherein said lock mechanism can prevent access to said chamber while in a locked position and allow said first and second lid to pivot to an open position to allow access to said chamber in an unlocked position;

a scanner mechanism securable to a trap door, said scanner mechanism for use in scanning each media disk placed through a scanner opening and storing information about each said media disk in memory;

wherein media data is inserted through the hatch assembly into the chamber and said volume of said chamber is adjusted by movement of said table, whereby removal of media data from said chamber is facilitated by raising said table for ease of access to the media data.

* * * * *